Jan. 19, 1965    D. J. FORSTER ETAL    3,166,170
TORQUE CONTROLLED CLUTCH MECHANISMS FOR POWER TRANSMISSIONS
Filed March 1, 1962                                         4 Sheets-Sheet 4
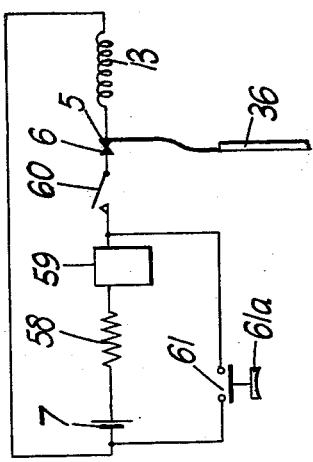
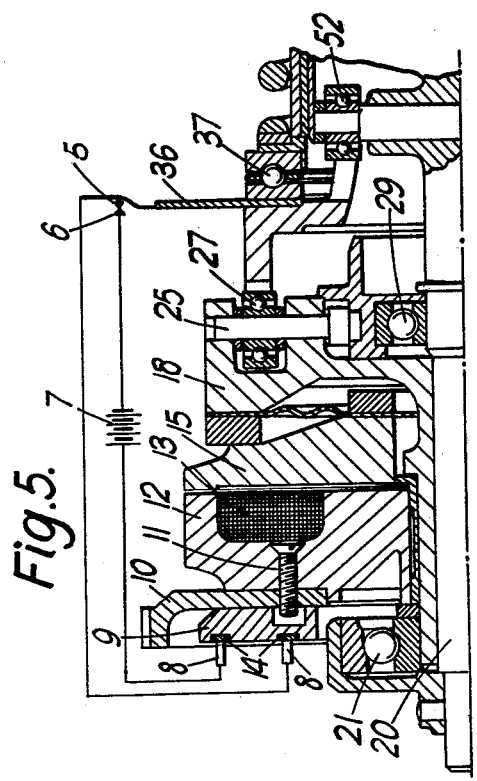
INVENTORS:
D. J. FORSTER &
N. D. SUTHERLAND
BY: Moore & Hall
ATTORNEYS.

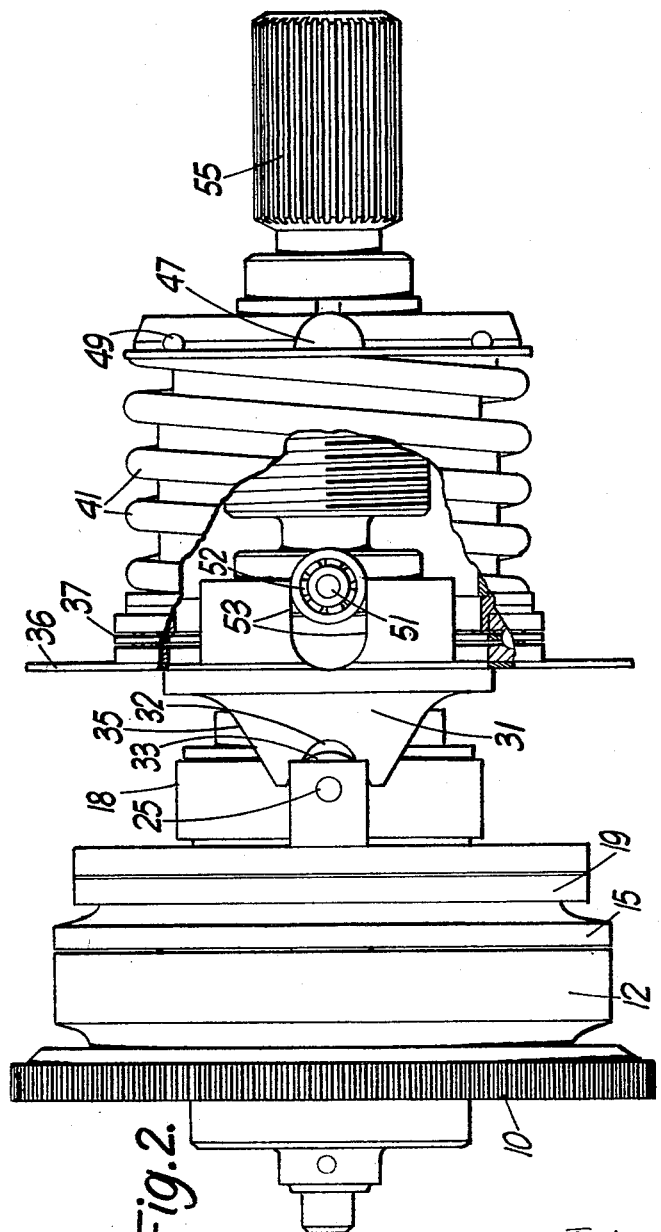

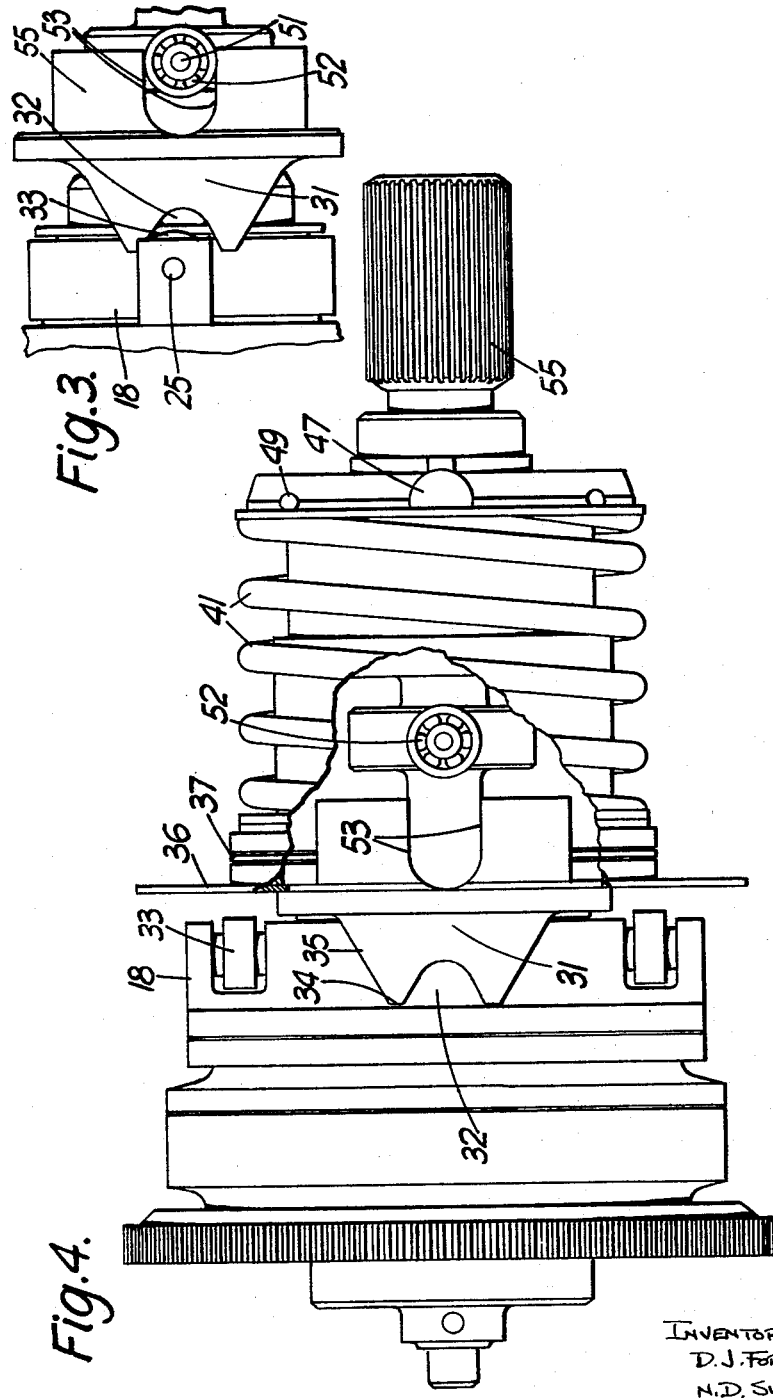

United States Patent Office 3,166,170
Patented Jan. 19, 1965

3,166,170
TORQUE CONTROLLED CLUTCH MECHANISMS
FOR POWER TRANSMISSIONS
David John Forster, Redditch, and Norman Donald Sutherland, Cheltenham, England, assignors to S. Smith & Sons (England) Limited, London, England, a British company
Filed Mar. 1, 1962, Ser. No. 176,615
14 Claims. (Cl. 192—48)

This invention relates to torque controlled clutch mechanisms for power transmissions particularly, but not exclusively, for use in transmissions between servo-motors of an auotomatic pilot for an aircraft and the surfaces of the aircraft which they control.

According to this invention a torque controlled clutch mechanism for a power transmission comprises torque responsive means arranged to control the operation of two clutches which are in mechanical series in the transmission and are both normally engaged in operation of the mechanism, so that one of the clutches is disengaged at a first predetermined torque value and is re-engaged or placed in condition for re-engagement by remote control upon subsequent reduction in the torque below that value and the other clutch is permanently disengaged at a higher predetermined torque value than the first predetermined torque value and is of such a character that it remains disengaged until re-engaged under the control of an operator. With this arrangement should the first clutch fail to be disengaged the second clutch is released before excessive torque is transmitted.

The first said clutch may be of the magnetic type having an energising coil in circuit with an electric source of supply and with an electric switch which is opened by the torque responsive device when the torque reaches the first predetermined value. The circuit may further include some provision for remote control of the clutch such that, if the switch is closed again after having been opened by the torque responsive device, the closure of the switch places the clutch in condition for re-engagement by remote control.

The other of the two clutches may be of the dog type.

The torque responsive means may comprise a cam and cam follower connected respectively to the output of the first clutch and the input of the other clutch or vice versa, resiliently yielding means restraining relative movement between the cam and cam follower whereby they transmit a drive between the clutches until a predetermined torque value is reached whereupon the relative movement between them, against the action of the restraining means, will have attained a magnitude such that means responsive to said movement will have disengaged the one clutch and if continued will result in disengagement of the other.

In one form of construction relative movement between the cam and cam follower may have an axial component which movement in one sense is against the action of a helical spring, one end of which engages an abutment on the output member of the other clutch and the other end engages a part associated with the cam or cam follower whichever is connected to the input member of the other clutch.

Known means may be provided for adjusting the initial loading of the spring so that the torques at which the two clutches disengage may be adjusted.

In such an arrangement the axially moving cam part may be connected to or be integral with one part of said dog clutch.

The cam may be so shaped and the dog clutch so arranged that with increase in torque there is relative movement between the cam and cam follower having both radial and axial components, which latter component of movement is arranged initially, as the torque transmitted increases, to be in a direction such as further to engage the dog clutch and also to disengage the first clutch, for example by opening the switch in circuit with its coil in the case of a magnetic clutch, and then to reverse in direction through a distance greater than the initial movement in the one direction such movement being arranged to disengage the dog clutch.

The following is a more detailed description of one form of torque controlled clutch mechanism according to the invention reference being made to the accompanying drawings in which:

FIGURE 2 is a side elevation of the apparatus showing the parts in the positions they assume under safe torque conditions;

FIGURE 3 is a similar view view to FIGURE 1 but showing the parts in the positions they assume under torque conditions which require the electro-magnetic clutch to be de-energised;

FIGURE 4 is a similar view to FIGURE 2 showing the position of the parts when the torque value increases beyond the last mentioned torque and the mechanical clutch is cut out;

FIGURE 5 shows the electric circuit associated with the clutch coil;

FIGURE 6 shows an alternative circuit.

Figure 1:
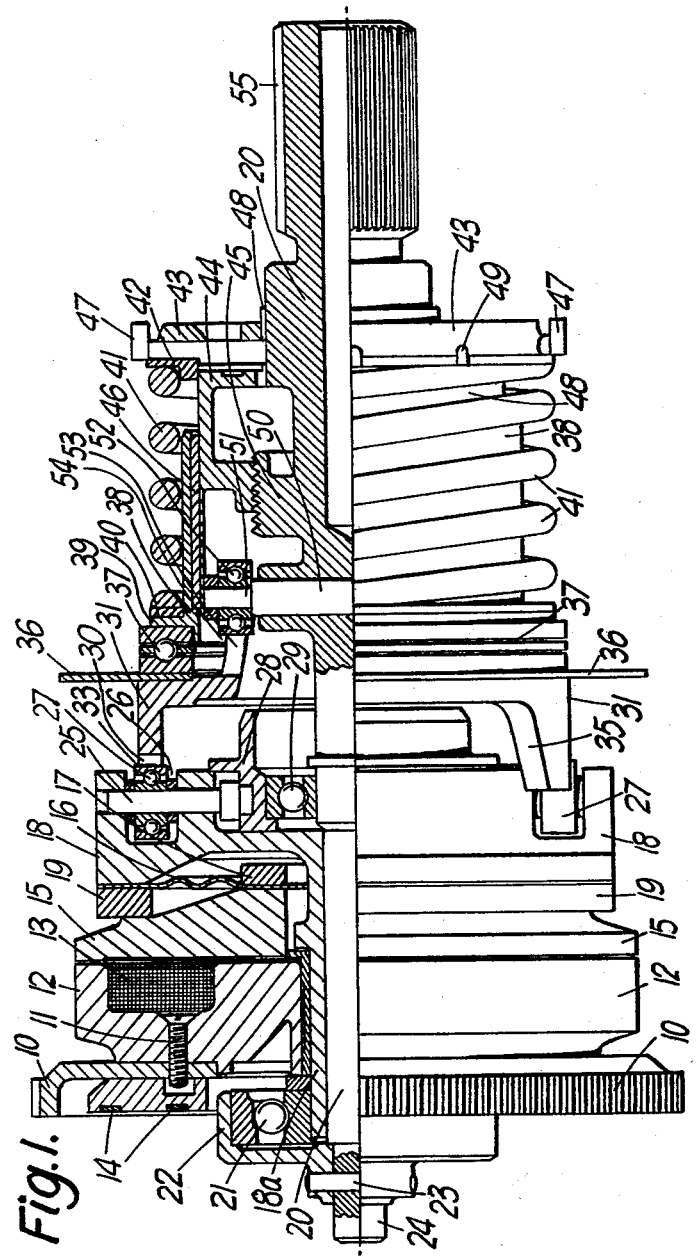
FIGURE 1 is a part longitudinal section and side elevation of the apparatus.

Referring to FIGURE 1 a servo-motor (not shown) is arranged to rotate an input gear wheel 10 which is secured by screws 11 to one part 12 of an electro-magnetic clutch. The clutch part 12 has an energising coil 13 connected to slip rings 14 on an insulating member 9 secured to the gear wheel 10 which slip rings are engaged by brushes 8 (see FIGURE 5) which are in circuit with a battery 7 and switch contacts 6, 5 operated as hereinafter described.

The output member 15 of the electro-magnetic clutch which is in the form of an armature is fixed to the inner peripheral portion of a corrugated resilient annular diaphragm 16 by means of a clamping ring 17 secured to the armature by screws (not shown). The outer peripheral portion of the diaphragm 16 is secured to a carrier 18 by a ring 19 and screws also not shown. The diaphragm 16 is provided to permit axial movement of the armature 15 on energisation of the coil 13 and is also preloaded due to the relative positions of the ring 19 and the armature 15 so that it exerts a force tending to disengage the clutch, thus providing a positive disengagement on de-energising the coil 13.

The carrier 18 has a tubular extension 18a which is rotatable on an output shaft 20 and is supported by a ball bearing 21 in a housing 22 which is fixed by a taper pin 23 to a reduced end 24 of the output shaft 20.

The carrier 18 has fixed in it two radially extending pins 25 at the opposite ends of a diameter which pins 25 extend across gaps 26 in the carrier and are encircled by ball bearings 27.

The pins 25 are locked in position by a housing 28 which is itself pressed into the carrier 18, the housing 28 being mounted by a ball bearing 29 on the output shaft 20. The ball bearings 27 constitute cam followers which are engageable with cam tracks 30 on a cam member 31. The cam track is formed with two diametrically opposed W-shaped surfaces, as best seen in FIGURES 2 to 4, each providing a central recess 32 in each of which normally the outer race 33 of one of the ball bearings 27 is located. The outer races 33 however, can ride up either side of the central recesses 32 the cam member 31 moving to the right (referring to the directions as shown in the drawing) against the action of a spring 41 as described below. Eventually the races 33 may pass over one of the apices 34 and then along one of the outer limbs of the inclined faces 35 of the W to a limiting position in which the cam member 31 is axially displaced to the left from the other limiting position where the races 33 are accommodated in the central recesses 32. Thus in passing from one limiting position to the other axial movement is imparted to the cam member.

Secured to the cam member 31 is a disc 36 by screws (not shown) and axial movement of the disc 36 is arranged to actuate the switch which is shown diagrammatically as comprising a blade 5 which normally is in engagement with a fixed contact 6. As indicated earlier the contacts are in circuit with energising coil 13 and the source of supply, the arrangement being such that movement of the member 31 to the right from the limiting position in which the races 33 are fully home in the recesses 32, by a predetermined amount (usually about two-thirds of the total movement in this direction as the races 33 ride up the sides of the recesses 32), actuates the switch to de-energise the coil 13.

Abutting against the disc 36 is a thrust ball bearing 37 which is supported by an outer sleeve 38 having a flange 39 which abuts the thrust bearing and against which abuts a washer 40.

One end of a helical spring 41 abuts the washer and the other end abuts a further washer 42, arranged on the inner side of a flange 43 on a nut 44.

The threads of the nut engage a threaded portion 45 of the output shaft 20. The nut has a cylindrical outer surface and an anti-friction sleeve 46 is disposed between the cylindrical surface and the sleeve 38. The anti-friction sleeve may be formed from poly-tetra-fluor-ethylene.

The nut 44 is provided with a number of radial holes 49 through chosen ones of which may be inserted locking pins 47 for engagement with grooves 48 formed in the shaft 20 so as to lock the nut 44 in a selected position.

Fixed to the output shaft 20 are two radially extending pins 50 at the opposite ends of a diameter only one of which is shown. Each pin is reduced at 51 to receive a ball bearing 52.

The outer race of each ball bearing is engageable with an axially extending slot 53 formed in a cylindrical extension 54 of the cam member 31.

The output shaft 20 is formed with a gear wheel 55 which drives a mechanical transmission for operating the aircraft control surface such as the rudder.

The mode of operation of the device is as follows:

Under safe torque conditions the strength of the spring 41 is sufficient to maintain the ball races 33 in engagement with both sides of the central recesses 32 in the cam member 31. Under these conditions each ball bearing 52 is disposed in the axially extending slot 53 in the cam member near the mouth of the slot. Should the torque exceed safe load conditions the thrust between the ball races 33 and the sides of the recesses 32 imparts axial movement towards the right to the cam member 31, each ball race 33 rolling along an inclined side of the corresponding recess 32. This axial movement is imparted to the disc 36 which, when the torque reaches the first predetermined value, opens the switch contacts 6, 5 in circuit with the electro-magnetic clutch 13 and should the switch and the clutch be operating correctly the clutch is de-energised and the drive interrupted. If the clutch disengages normally, the races 33 will start to return to the inner ends of the recesses 32, allowing the cam member 31 and the disc 36 to return to a position in which the clutch is re-energised. If, however, the electro-magnetic clutch has become jammed or the switch contacts do not operate, the drive will continue and further increase of torque will move the cam member 31 further to the right until eventually the ball races 33 will pass over the apices 34 and down inclined faces 35. As the races 33 pass over the apices 34, the direction of the axial motion of the member 31 reverses and it eventually reaches a position further to the left than when the races 33 were located in the recesses 32.

This reversal of the axial movement of the cam member 31 is sufficient to draw the axial slots 53 clear of the ball bearings 52 thus disengaging the dog clutch by the slots 53 and bearings 52 and interrupting the drive to the output shaft 20. In order to re-establish the drive it will first be necessary to rotate the output shaft 20 until the ball bearings 52 are brought opposite the axial slots 53. The cam member 31 is then moved to the right against the force of the spring 41 and the carrier 18 is then rotated until the races 33 are in line with the central recesses 32 in the cam member 31 at which point the cam member 31 is released and the drive is thus re-established.

FIGURE 6 shows a circuit which may be used when it is required that, if the contacts 5, 6 are closed again after having been opened by the disc 36 the closure places the clutch coil circuit in condition for re-energisation by remote control, instead of re-energising the coil 13 immediately as in the circuit shown in FIGURE 5.

It will be seen from FIGURE 6 that, as compared with the circuit of FIGURE 5, a resistor 58, the winding 59 of an electro-magnetic relay and a normally open contact 60 of that relay are connected in series in the order given between the battery 7 and the contacts 5, 6. In addition a push button controlled switch contact 61 is connected across the series combination of the battery 7, the resistor 58 and the relay winding 59. The switch contact 61 is normally opened and is arranged to be closed by manual operation of a push button indicated diagrammatically at 61a.

When the circuit is in the condition shown in FIGURE 6, the coil 13 is un-energised. If the contact 61 is closed by operating the push button 61a it completes a circuit for energising the relay winding 59, the resistor 58 being included simply to limit the magnitude of the current flowing. When the relay winding 59 is energised, contact 60 closes and, if the contacts 6, 5 are also closed (i.e. if the torque is below the first predetermined value), a circuit for energising the clutch coil 13 is also completed. This same circuit will operate to hold the relay winding 59 energised even if the switch contact 61 is released so that momentary operation of the push button will result in the coil 13 being energised and remaining so, assuming the torque to be less than the first predetermined value. If, subsequently, the contacts 5, 6 are opened by the disc 36 as a result of the torque increasing above the first predetermined value, the circuit which is holding both the clutch coil 13 and the relay winding 59 energised, is broken and the clutch will dis-engage. At the same time, however, the contact 60 will open owing to the de-energisation of the relay winding 59 and, as a result, when the contacts 5, 6 close again (the torque having decreased below the first pre-determined value) the coil 13 will not be re-energised. This can only occur if the contact 61 is closed again by operation of the push button 61a when the sequence of events described above will be repeated. It will be appreciated that in practice the push button 61a may be positioned remotely from the clutch coil 13 and the contacts 6, 5.

It will be appreciated that the predetermined torque values can be adjusted by alteration of the compression of the spring 41, the position of the nut 44 being adjusted accordingly.

The above arrangements are particularly applicable to automatic pilots for aircraft. It is known that, in such automatic pilots, signals derived from gyros and other sources, depending on the aircraft's attitude or motion, set into operation servo-motors through suitable servo-amplifiers, and such servo-motors are usually coupled by electro-magnetic clutches to output members. Each output member is usually the input member of a hydraulic actuator, the output member of which moves the appropriate aircraft control surface, for example a rudder.

In order to prevent damage to the automatic pilot and associated mechanism, should for example a control surface of the aircraft become jammed, an electric switch in circuit with an electro-magnetic clutch in the appropriate coupling is opened under the control of some torque responsive means, should a predetermined torque develop in the transmission between the servo-motors and the hydraulic actuator. If subsequently the fault disappears so that the torque is reduced, the clutch becomes re-engaged or may be re-engaged by some remote switching control if such is provided.

In automatic pilots a high degree of safety is required and, for example, it is necessary to make provision against mal-function, for example the electro-magnetic clutch may remain engaged due to faulty contacts in the torque controlled switch even though the safe torque has been exceeded.

It will be appreciated that by providing in series with the electro-magnetic clutch a mechanical clutch which becomes automatically disengaged at a predetermined torque value greater than that at which the electro-magnetic clutch is disengaged the harmful effect of the faulty contacts or other mal-operation of the electro-magnetic clutch or its circuit may be avoided.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A torque-controlled clutch mechanism comprising two clutches each having two operative conditions in one of which it is engaged to transmit torque applied thereto, and in the other of which it is disengaged to inhibit transmission thereby of applied torque; torque responsive means which is coupled in mechanical series with a first of the two clutches to receive torque transmitted by the first clutch, the torque responsive means having two members one of which is displaced with respect to the other, in dependence upon the magnitude of torque applied to the torque responsive means, the displacement of said one member with respect to the other being of a first extent in response to the applied torque of a first predetermined magnitude and of a second, larger extent in response to applied torque of a second predetermined magnitude larger than said first magnitude; control means for the first clutch which means is responsive to the extent of said displacement to maintain said first clutch engaged to transmit torque when said displacement is less than said first extent and to disengage said first clutch when said displacement is at least equal to said first extent; means coupling the second clutch in mechanical series with said first clutch, and control means for the second clutch which means is responsive to displacement of said one member to said second extent to disengage said second clutch so that no torque is transmitted by the second clutch.

2. A torque-controlled mechanism comprising, a first clutch having an operative condition in which it is engaged to transmit torque and an operative condition in which it is disengaged so that no torque is transmitted thereby; means having at least three operative states which is coupled to said first clutch to receive the torque transmitted by said first clutch and which is responsive to the received torque to adopt, in accordance with the magnitude of the received torque, one of said three states, a first of the states being adopted when the magnitude of the received torque is less than a first predetermined value, a second of the states being adopted when the magnitude of the received torque is intermediate the first value and a second predetermined value which is larger than said first value, and the third state being adopted when the magnitude of the received torque exceeds said second value; means for controlling the operative condition of the first said clutch which means is responsive to the state of the torque responsive means to maintain said first clutch engaged to transmit torque when the torque responsive means is in its first state and to disengage said first clutch when the torque responsive means is in its second state; a second clutch coupled in mechanical series with said first clutch in a normally engaged condition for transmitting torque, and settable to a condition in which it is disengaged so that no torque is transmitted thereby; and means responsive to change in the state of the torque responsive means from the said second to third state to set said second clutch to its disengaged condition.

3. A torque-controlled clutch mechanism for a power transmission comprising a first clutch and a second clutch arranged in mechanical series, torque responsive means comprising two elements one of which is displaceable in relation to the other against the action of resiliently yielding means, the extent of said displacement being dependent on the torque transmitted by the device, means for disengaging the first said clutch and means for disengaging the second said clutch, both of which means are actuated by displacement of said one element of the torque responsive means, the displacement of said one element at a first predetermined torque value actuating said means for disengaging the first said clutch and the subsequent displacement of said one element at a second, and higher, torque value, actuating said means for disengaging the second said clutch.

4. A torque-controlled clutch mechanism according to claim 1 wherein the first said clutch is of a magnetic type having an energizing coil in circuit with an electric source of supply and wherein said control means for the first clutch comprises an electric switch in circuit with the coil and means responsive to displacement of said one member to said first extent to open said switch.

5. A torque-controlled clutch mechanism according to claim 4, including an electro-magnetic relay having an energizing coil and a set of contacts which are closed when the relay coil is energized; an energizing circuit for the relay coil which circuit includes a second switch that is operable to complete for a short period the energizing circuit; and means connecting the relay coil, the relay contacts, the first-mentioned switch, and the clutch coil in series with one another so that after said second switch has been operated to energize the relay coil the clutch and relay coils remain energized until said first-mentioned switch is opened whereupon they are both de-energized and remain so until the relay coil is again energized by operation of said second switch.

6. A torque-controlled clutch mechanism according to claim 1 wherein the second of the two clutches is of the dog type.

7. A torque-controlled clutch mechanism according to claim 1 wherein said two members of the torque responsive means comprise a cam and cam follower connected between the output of said first clutch and the input of said second clutch, there being provided resiliently yielding means tending to restrain relative displacement between the cam and cam follower, the aforesaid control means for the first clutch and control means for the second clutch being responsive to first and second extents of said displacement respectively.

8. A torque-controlled clutch mechanism according to claim 7 wherein said relative displacement between the cam and cam follower has a component in the direction of the axis of the second clutch and wherein said resiliently yielding means comprise a helical spring which tends both to disengage the second clutch and to restrain in one sense the axial component of displacement between the cam and cam follower.

9. A torque-controlled clutch mechanism according to claim 8 wherein means are provided for adjusting the initial loading of the spring so that the magnitudes of the torques at which the two clutches disengage may be adjusted.

10. A torque-controlled clutch mechanism according to claim 8 wherein said second clutch is a dog clutch and wherein one cam part which has an axial component of displacement is connected to one part of said dog clutch so that said axial component of displacement effects disengagement of said dog clutch when said displacement reaches the aforesaid second extent.

11. A torque-controlled clutch mechanism according to claim 8 wherein said second clutch is a dog clutch and wherein said cam is so shaped and the dog clutch is so arranged that with increase in torque there is relative displacement between the cam and cam follower which displacement has a component in the direction of the axis of said dog clutch which component of displacement is arranged initially, as the torque transmitted increases, to be in a sense such as further to engage the dog clutch and which displacement when it reaches said first extent causes said control means for the first clutch to disengage the first clutch, and then changes to the opposite sense until it reaches said second extent in that sense whereupon it causes said control means for the dog clutch to disengage said clutch.

12. A torque-controlled mechanism comprising, a first clutch having an operative condition in which it is engaged to transmit torque and an operative condition in which it is disengaged so that no torque is transmitted thereby; a cam arrangement responsive to torque transmitted by the first clutch and comprising a cam member and a cam follower member one of which two members is coupled to the first clutch and the other of which is displaceable axially with respect to said one member, the cam member having a cam surface comprising a recess to engage with the cam-follower member for transmitting the torque transmitted by the first clutch from said one member to the other, a first inclined portion leading from the recess for acting upon the cam-follower member to effect axial displacement of said other member in a first sense, and, leading from said first portion, a second portion which is inclined in the opposite sense to the first portion for effecting axial displacement of said other member in a second sense which is opposite to said first sense; means for controlling said first clutch to effect change from the engaged to the disengaged condition of the first clutch in response to displacement of said other member in said first sense; a second clutch having two parts which engage with one another for transmission of torque by the second clutch, a first of the two parts being displaceable axially with respect to the second part for disengaging the two parts; means coupling the first part of the second clutch to said other member of the cam arrangement to disengage said first part from said second part in response to axial displacement of said other member in said second sense; and spring means tending to displace said other member in said second sense so that when the cam-follower member is in engagement with the recess of the cam member torque transmitted by the first clutch is transmitted via the cam arrangement to the second clutch, and that in the event that the value of the transmitted torque increases beyond a first predetermined range the cam-follower member leaves the recess against the action of the spring means to follow the first inclined portion of the cam member, and then for further increase of the value of the transmitted torque beyond a second predetermined range is urged under the action of the spring means to follow the second portion of the cam member thereby to disengage the second clutch.

13. In combination in a torque-controlled clutch mechanism for use in power transmission between servo-motors of an automatic pilot for an aircraft and the movable surfaces of the aircraft which the automatic pilot and the servo-motors control, comprising, a first clutch means having engaged and unengaged operating conditions, a second clutch means also having engaged and unengaged operating conditions, torque-responsive means having at least two relatively movable members, connecting means for coupling said second clutch in series drive relation to said first clutch, control means for said first and said second clutches, one of said members being mounted for displacement with respect to the other of said members by a first extent in response to torque of a first predetermined magnitude applied to said torque responsive means, said one of said members being displaced a second greater extent in response to torque of a second predetermined magnitude applied to said torque responsive means, said control means being responsive at least in part to the relative displacement of said members to maintain said first clutch means in engaged condition when said relative displacement is less than said first extent, and acting to cause said first clutch to disengage when said relative displacement is at least equal to said first extent, said control means being also responsive to the relative displacement of said one of said members to said second greater extent to disengage said second clutch means.

14. The combination set forth in claim 13, said first clutch means being magnetic, said control means comprising a first control means for said first clutch means and a second control means for said second clutch means, said first control means comprising an electric circuit having an energizing coil and a switch which is opened by said torque responsive means.

References Cited by the Examiner
UNITED STATES PATENTS

| | | | |
|---|---|---|---|
| 2,052,152 | 8/36 | Webb | 192—150 X |
| 2,068,260 | 1/37 | Biggert | 192—56 |
| 2,741,352 | 4/56 | Stevens et al. | 192—56 |
| 2,765,059 | 10/56 | Amtsberg | 192—56 |
| 2,856,046 | 10/58 | Bofinger | 192—56 |

DAVID J. WILLIAMOWSKY, *Primary Examiner.*

THOMAS J. HICKEY, *Examiner.*